(12) United States Patent
 Li

(10) Patent No.: US 12,594,891 B2
(45) Date of Patent: Apr. 7, 2026

(54) UNDER-SEAT STORAGE SYSTEM FOR A VEHICLE

(71) Applicant: Nissan North America, Inc., Franklin, TN (US)

(72) Inventor: Xin Shuang Li, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 497 days.

(21) Appl. No.: 18/068,334

(22) Filed: Dec. 19, 2022

(65) Prior Publication Data

US 2024/0198913 A1 Jun. 20, 2024

(51) Int. Cl.
   B60R 7/04 (2006.01)
   B60N 2/02 (2006.01)

(52) U.S. Cl.
   CPC ................ B60R 7/043 (2013.01); B60N 2/02 (2013.01)

(58) Field of Classification Search
   CPC . B60R 7/043; B60R 11/06; B60R 2011/0012; B60R 2011/0052; B60N 3/103; B60N 3/101; B60N 2/90; B64D 11/0636
   USPC ...... 296/37.15; 297/188.08, 188.12; 224/275
   See application file for complete search history.

(56) References Cited

U.S. PATENT DOCUMENTS

| | | | | |
|---|---|---|---|---|
| 2,968,341 A | * | 1/1961 | Welles | .................... B60R 7/043 |
| | | | | 312/235.5 |
| 3,131,813 A | | 5/1964 | Jensen | |
| 3,625,347 A | * | 12/1971 | Trammell, Jr. | ......... B60R 7/043 |
| | | | | 224/281 |
| 4,927,200 A | | 5/1990 | Wilkins | |
| 5,129,615 A | * | 7/1992 | Strauss | ..................... B60R 7/12 |
| | | | | 248/311.2 |
| 5,716,091 A | | 2/1998 | Wieczorek | |
| 5,902,009 A | | 5/1999 | Singh et al. | |
| 5,957,521 A | | 9/1999 | Schlachter | |
| 6,419,313 B1 | * | 7/2002 | Newman | ................ B60R 7/043 |
| | | | | 297/188.1 |
| 6,948,693 B2 | | 9/2005 | Goodbred | |
| 7,530,631 B2 | | 5/2009 | Skelly et al. | |
| 7,780,229 B2 | | 8/2010 | Verhee | |
| 8,770,661 B2 | | 7/2014 | Kalergis et al. | |
| 9,090,209 B2 | | 7/2015 | Aguirre et al. | |
| 9,421,915 B2 | | 8/2016 | Kalergis et al. | |

(Continued)

FOREIGN PATENT DOCUMENTS

| | | | |
|---|---|---|---|
| BR | PI0917563 B1 | | 4/2019 |
| CN | 114889505 A | * | 8/2022 |

(Continued)

OTHER PUBLICATIONS

Kröner et al. (WO 2019048396 A1), machine translation (Year: 2019).*

*Primary Examiner* — Amy R Weisberg
*Assistant Examiner* — Wenwei Zhuo
(74) *Attorney, Agent, or Firm* — Young Basile Hanlon & MacFarlane, P.C.

(57) ABSTRACT

A storage system configured for connection to a seat in a vehicle and including: a bracket that is configured for connection to the seat; a storage compartment that is configured to accommodate at least one personal article; and a fastener that is configured to connect the bracket to the storage compartment such that the bracket extends between the seat and the storage compartment.

20 Claims, 4 Drawing Sheets

(56)                    References Cited

U.S. PATENT DOCUMENTS

|  |  |  |  |  |
|---|---|---|---|---|
| 9,873,383 | B1 * | 1/2018 | Mather | B60R 7/043 |
| 9,908,623 | B2 | 3/2018 | Hashberger et al. | |
| 10,137,841 | B1 | 11/2018 | Neag et al. | |
| 10,160,392 | B2 | 12/2018 | Line et al. | |
| 10,427,610 | B2 | 10/2019 | Nasca et al. | |
| 10,625,680 | B1 | 4/2020 | Koehler et al. | |
| 10,793,076 | B2 | 10/2020 | Brown et al. | |
| 2006/0006704 | A1 | 1/2006 | Skelly et al. | |
| 2007/0284923 | A1 * | 12/2007 | Thoreux | B64D 11/06395 |
| | | | | 297/217.3 |
| 2008/0061606 | A1 | 3/2008 | Skelly et al. | |
| 2009/0001749 | A1 | 1/2009 | Johnson et al. | |
| 2010/0243852 | A1 * | 9/2010 | Muraishi | B60N 2/0715 |
| | | | | 248/429 |
| 2014/0252818 | A1 * | 9/2014 | Kaser | B60R 7/043 |
| | | | | 297/188.01 |
| 2015/0034641 | A1 * | 2/2015 | Aruga | B65D 25/38 |
| | | | | 220/214 |
| 2017/0197553 | A1 * | 7/2017 | Loera | B60N 2/90 |
| 2018/0297533 | A1 * | 10/2018 | Mozurkewich | B60N 2/3013 |
| 2018/0326914 | A1 * | 11/2018 | Coyle | B60N 2/005 |
| 2019/0077491 | A1 * | 3/2019 | Schalla | B63C 9/23 |
| 2019/0152401 | A1 * | 5/2019 | Gargano | B60R 7/04 |
| 2020/0247324 | A1 * | 8/2020 | Brown | B60R 7/043 |
| 2023/0138174 | A1 | 5/2023 | Li | |

FOREIGN PATENT DOCUMENTS

|  |  |  |  |  |  |
|---|---|---|---|---|---|
| DE | 19836396 | A1 | 3/1999 | | |
| DE | 19807319 | A1 | 8/1999 | | |
| DE | 102014005601 | A1 | 11/2014 | | |
| DE | 102018206555 | A1 | 11/2018 | | |
| DE | 102018008614 | A1 | 5/2019 | | |
| EP | 1932724 | B1 * | 10/2009 | | B60R 7/043 |
| FR | 2710297 | A1 * | 3/1995 | | B60N 2/44 |
| FR | 2992264 | A1 | 12/2013 | | |
| GB | 2562473 | A | 11/2018 | | |
| GB | 2574788 | A | 12/2019 | | |
| KR | 200156291 | Y1 | 9/1999 | | |
| KR | 20130090865 | A | 8/2013 | | |
| WO | WO-2019048396 | A1 * | 3/2019 | | |

* cited by examiner

UNDER-SEAT STORAGE SYSTEM FOR A VEHICLE

TECHNICAL FIELD

The present disclosure relates to an under-seat storage system for a vehicle that includes a storage compartment and a bracket that is configured to connect the storage compartment to a seat in the vehicle.

BACKGROUND

Vehicles often include a variety of storage areas in the dashboard, the center console, the vehicle doors, etc. The space beneath the (front) passenger seats, however, is generally underutilized, which creates an opportunity for increased storage capacity.

The present disclosure addresses this opportunity by providing an under-seat storage system that is configured to receive one or more personal articles (e.g., umbrellas, articles of clothing, loose change, maps, cell phones or other such personal electronics, beverage containers, etc.).

SUMMARY

In one aspect of the present disclosure, a vehicle is disclosed that includes: a passenger seating area; a seat that is repositionable within the passenger seating area; a drive mechanism that is operatively connected to the seat such that the seat is movable within the passenger seating area; and a storage system that is configured to receive at least one personal article. The storage system includes: a bracket that is connected to the seat, and a storage compartment that is connected to the bracket such that the bracket extends between the seat and the storage compartment.

In certain embodiments, the storage compartment may include: a pair of sidewalls; a rear end wall that extends between the pair of sidewalls; a forward end wall that extends between the pair of sidewalls; and a base wall that extends between the pair of sidewalls, the rear end wall, and the forward end wall.

In certain embodiments, the base wall may define a well that is configured to at least partially receive the drive mechanism and thereby create increased clearance for the drive mechanism.

In certain embodiments, the bracket and the storage compartment may be configured as discrete components of the storage system.

In certain embodiments, the storage system may further include a fastener that extends through the bracket and into the storage compartment to thereby connect the bracket and the storage compartment.

In certain embodiments, the storage compartment may include: at least one opening that is configured to receive the fastener, and at least one locator pin that is configured for engagement with the bracket to facilitate proper relative positioning of the bracket and the storage compartment.

In certain embodiments, the bracket may include: a first aperture that is configured to receive the fastener, and a second aperture that is configured to receive the at least one locator pin.

In certain embodiments, the storage compartment may be configured such that the bracket is connectable thereto in a first orientation corresponding to a first configuration of the seat and in a second orientation corresponding to a second configuration of the seat.

In certain embodiments, the storage compartment may include: a first opening that is configured to receive the fastener such that the fastener extends through the first aperture in the bracket and into the first opening when the bracket is in the first orientation; a first locator pin that is configured for insertion into the second aperture in the bracket when the bracket is in the first orientation; a second opening that is configured to receive the fastener such that the fastener extends through the first aperture in the bracket and into the second opening when the bracket is in the second orientation; and a second locator pin that is configured for insertion into the second aperture in the bracket when the bracket is in the second orientation.

In certain embodiments, the bracket may include a forward-facing mounting surface that is configured for engagement with an inner surface of the seat.

In certain embodiments, the bracket may include an arm having: a first segment extending along a first axis that is oriented in generally parallel relation to a height of the storage compartment; a second segment that is connected to the first segment and which extends along a second axis that is oriented in generally parallel relation to a width of the storage compartment; a third segment that is connected to the second segment and which extends along a third axis that is oriented in generally parallel relation to the first axis; a fourth segment that is connected to the third segment and which extends along a fourth axis that is oriented in generally parallel relation to the second axis; and a fifth segment that is connected to the fourth segment and which extends along a fifth axis that is oriented in generally parallel relation to the first axis and the third axis.

In certain embodiments, the fifth segment may define the forward-facing mounting surface.

In certain embodiments, the bracket may include: a first elbow that is located between the first segment and the second segment; a second elbow that is located between the second segment and the third segment; a third elbow that is located between the third segment and the fourth segment; and a fourth elbow that is located between the fourth segment and the fifth segment.

In certain embodiments, the first elbow may define a first angle that is substantially equal to approximately 90°.

In certain embodiments, the second elbow may define a second angle that is substantially equal to approximately 90°.

In certain embodiments, the third elbow may define a third angle that is substantially equal to approximately 90°.

In certain embodiments, the fourth elbow may define a fourth angle that is substantially equal to approximately 90°.

In another aspect of the present disclosure, a storage system is disclosed that is configured for connection a seat in a vehicle. The storage system includes: a bracket that is configured for connection to the seat; a storage compartment that is configured to accommodate at least one personal article; and a fastener that is configured to connect the bracket to the storage compartment such that the bracket extends between the seat and the storage compartment.

In certain embodiments, the storage compartment may define: a width extending along a first axis; a depth extending along a second axis that is oriented in generally orthogonal relation to the first axis; and a height extending along a third axis that is oriented in generally orthogonal relation to the first axis and the second axis.

In certain embodiments, the bracket may include a mounting surface that is configured for engagement with the seat and which is oriented in generally parallel relation to the width of the storage compartment and the height of the storage compartment and in generally orthogonal relation to the depth of the storage compartment.

In certain embodiments, the storage compartment may be configured such that the bracket is connectable thereto in a first orientation and in a second orientation.

In certain embodiments, the storage compartment may include: a first opening that is configured to receive the fastener when the bracket is in the first orientation; a first locator pin; a second opening that is configured to receive the fastener when the bracket is in the second orientation; and a second locator pin.

In certain embodiments, the bracket may include: a first aperture that is configured to receive the fastener, and a second aperture that is configured to receive the first locator pin when the bracket is in the first orientation and the second locator pin when the bracket is in the second orientation.

In another aspect of the present disclosure, a method is disclosed for creating under-seat storage in a vehicle. The method includes connecting a storage compartment to a seat in the vehicle via a bracket such that the storage compartment is located beneath the seat with the bracket extending therebetween.

In certain embodiments, connecting the storage compartment to the seat may include positioning the storage compartment such that a drive mechanism operatively connected to the seat is at least partially received by a well that is defined by a base wall of the storage compartment.

In certain embodiments, connecting the storage compartment to the seat may include positioning a forward-facing mounting surface defined by the bracket adjacent to an inner surface of the seat.

In certain embodiments, connecting the storage compartment to the seat may include inserting a fastener through the bracket and into one of a first opening and a second opening defined by the storage compartment such that the fastener connects the bracket to the storage compartment.

In certain embodiments, connecting the storage compartment to the seat may further include inserting one of a first locator pin and a second locator pin on the storage compartment into an aperture defined by the bracket to facilitate proper relative positioning of the bracket and the storage compartment.

BRIEF DESCRIPTION OF THE DRAWINGS

According to common practice, the various features of the drawings may not be to scale and may be arbitrarily expanded or reduced for clarity.

DETAILED DESCRIPTION

The present disclosure describes under-seat storage systems for vehicles that include a storage compartment, and a bracket that is configured for (mechanical) connection to the storage compartment and a seat in the vehicle (e.g., a front passenger seat) such that the bracket extends therebetween. The storage compartment and the bracket are connectable in multiple orientations, which allows for use of the storage system with seats that vary in configuration (e.g., seats that are configured for movement in four degrees-of-freedom, seats that are configured for movement in eight degrees-of-freedom, etc.).

Figures 1, 2:
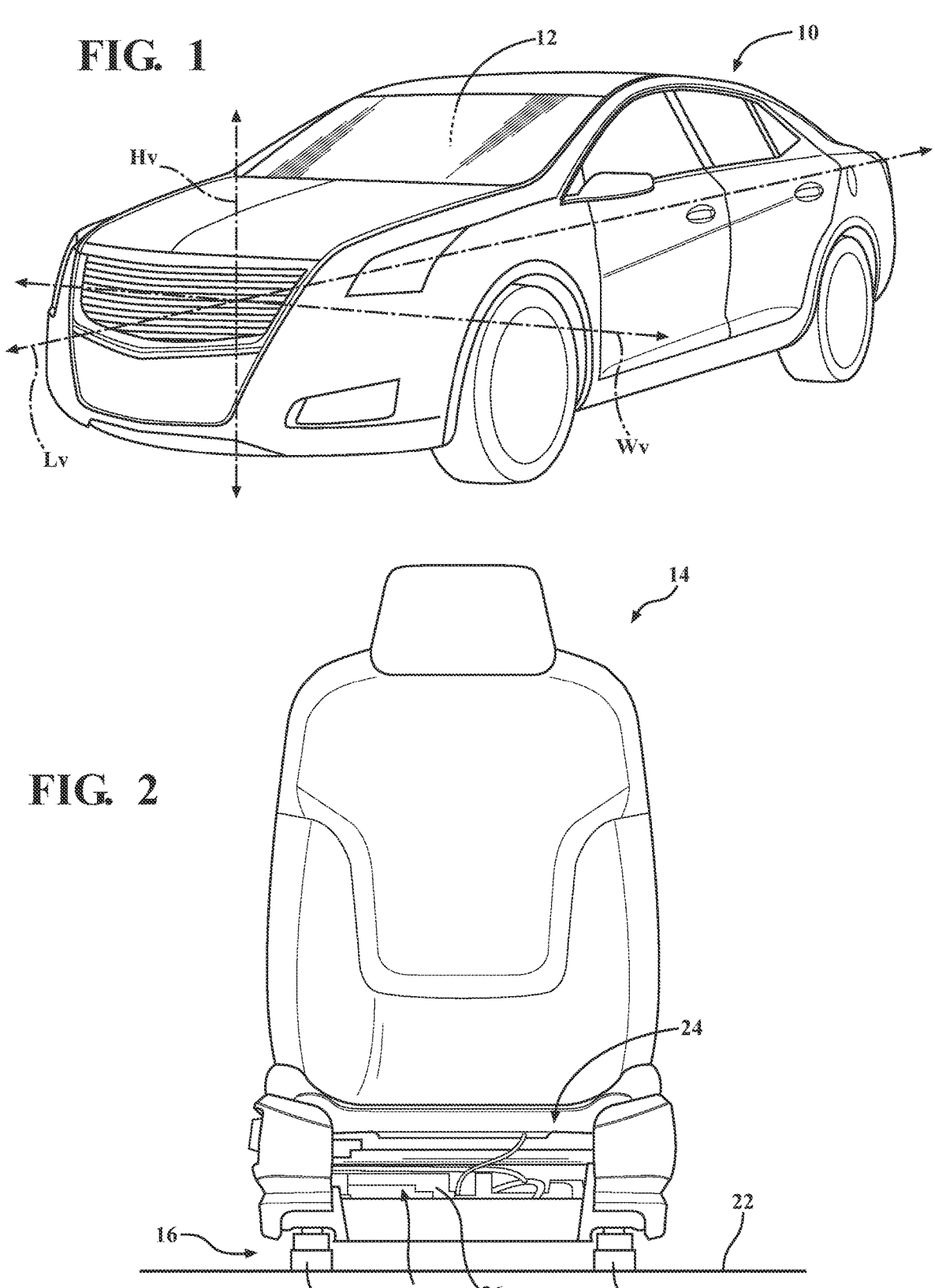
FIG. 1 is a front, perspective view of a vehicle according to the principles of the present disclosure.
FIG. 2 is a front, plan view of an exemplary seat in a vehicle.
Figures 3, 5:
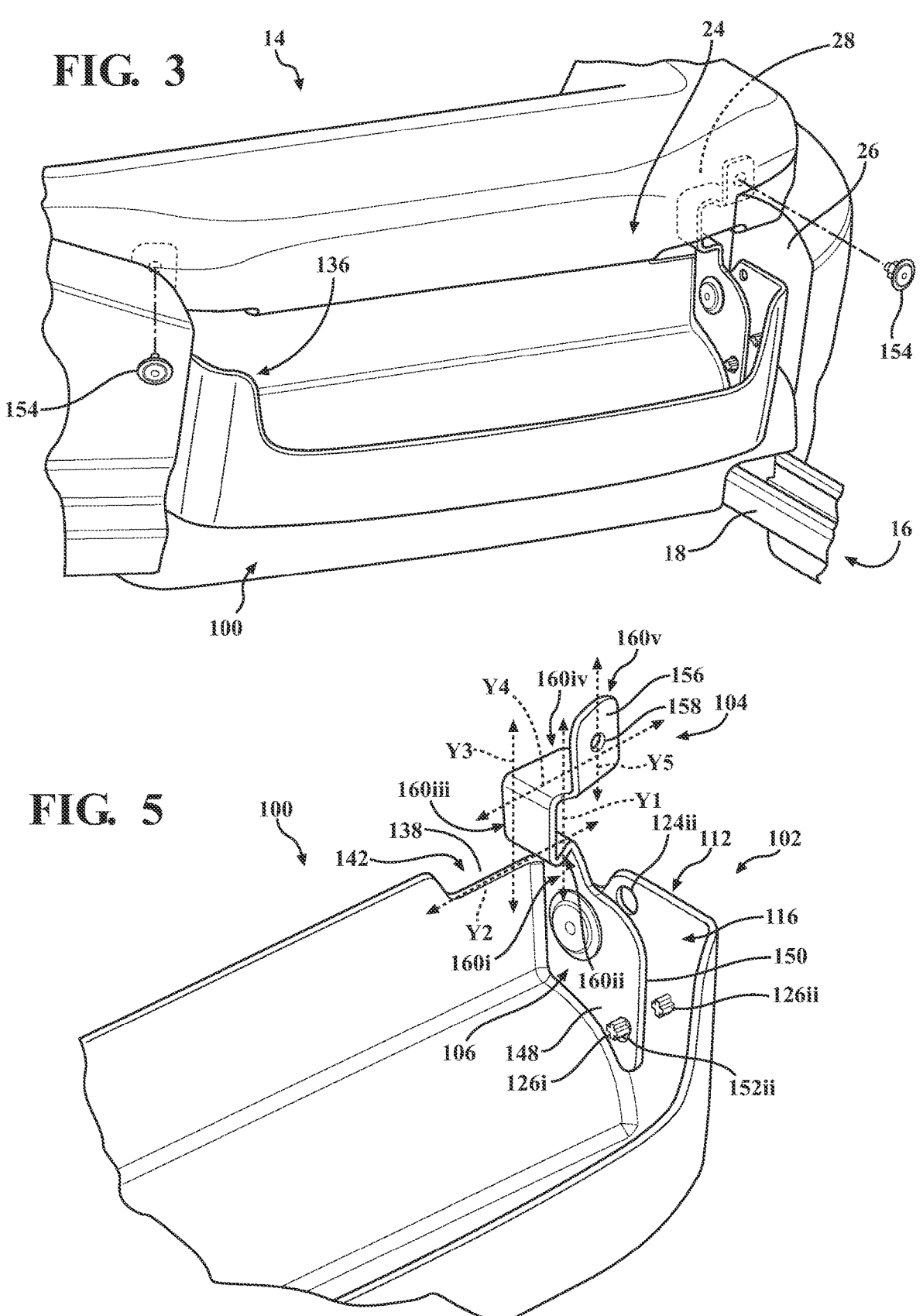
FIG. 3 is a partial, front, perspective view of the seat seen in FIG. 2 shown with a storage system according to the principles of the present disclosure, which includes a storage compartment and one or more brackets that connect the storage compartment to the seat.
FIG. 5 is a partial, top, perspective view of the storage system.

With reference to FIGS. 1-3, a vehicle 10 is illustrated that includes a passenger seating area 12; one or more repositionable seats 14; and one or more under-seat storage systems 100. Although the vehicle 10 is generally illustrated and described as a passenger vehicle throughout the present disclosure, it should be appreciated that the storage systems 100 described herein may find applicability to wide variety of vehicles. For example, it is envisioned that the storage systems 100 may be adapted for use with trucks, SUVs, vans, boats, airplanes, trains, etc.

Each seat 14 is movably supported by (e.g., connected to) a corresponding rail system 16, which includes a plurality of individual rails 18 and allows for repositioning of the seat 14 within the passenger seating area 12. For example, it is envisioned that the seat 14 and the corresponding rail system 16 may be configured such that the seat 14 is movable (slidable) axially (e.g., along a length Lv of the vehicle 10), laterally (e.g., along a width Wv of the vehicle 10), and/or vertically (e.g., along a height Hv of the vehicle 10). To support movement and/or reconfiguration of the seat 14 (e.g., tilting, lumbar adjustment, etc.), the vehicle 10 includes one or more drive mechanisms 20, which are located beneath the seat 14 and are operatively connected thereto. The drive mechanism(s) 20 may include any components suitable for the intended purpose of moving and/or reconfiguring the corresponding seat 14 in the manner indicated above including, for example, one or more motors, one or more wiring harnesses, etc. It is envisioned that the drive mechanism(s) 20 may be positioned in any suitable location depending, for example, upon the style of the vehicle 10, the configuration of the seats 14, spatial constraints, etc. For example, it is envisioned that the drive mechanism(s) 20 may be positioned beneath the corresponding seats 14, as shown in FIG. 2, connected to (or otherwise supported by) the floor 22 of the vehicle 10 or the corresponding rail system 16, etc.

With reference now to FIGS. 4-6B as well, the storage system(s) 100 will be discussed. While a single storage system 100 is illustrated throughout the figures, it should be appreciated that the vehicle 10 may include one or more additional storage systems 100. For example, embodiments are envisioned in which a storage system 100 may be connected to each seat 14 in the vehicle 10, as are embodiments in which a storage system 100 may be connected to the front passenger seat 14 only.

The storage system 100 is connected to the seat 14 such that the storage system 100 is fixed in relation thereto and movable therewith during repositioning of the seat 14 within the passenger seating area 12. More specifically, in the particular embodiment illustrated, the storage system 100 is connected to a seat pan 24 (FIG. 2), which adds structure to the seat 14 and supports the cushion, padding, etc. The storage system 100 is configured such that, upon installation, the storage system 100 is positioned with an under-seat receiving area 26 that is collectively defined by the seat 14 and the floor 22 of the vehicle 10. As seen in FIG. 2, the storage system 100 is positioned between the rails 18 and is entirely disconnected (disengaged) therefrom, which inhibits (if not entirely prevents) any interference with operation (e.g., movement and/or reconfiguration) of the seat 14. Location of the storage system 100 beneath the seat 14 and between the rails 18 not only makes use of otherwise underutilized space in the passenger seating area 12, but conceals, protects, and obscures the drive mechanism(s) 20 from view. To further enhance protection and concealment of the drive mechanism(s) 20, in certain embodiments of the disclosure, it is envisioned that the storage system 100 may be configured to extend vertically from the seat 14 to a location adjacent to, but spaced (vertically) from, the floor 22 (e.g., so as not to interfere with movement of the seat 14 along the rails 18). For example, it is envisioned that the storage system 100 may be configured so as to define a gap G (FIGS. 6A, 6B) with the floor 22 that lies substantially within the range of (approximately) 0.25" to (approximately) 1". Embodiments in which the storage system 100 may be configured such that the gap G lies outside the disclosed range, however, would not be beyond the scope of the present disclosure.

The storage system 100 includes: a storage compartment 102 (FIG. 5) (e.g., a receptacle, a bin, or other such container); one or more brackets 104; and one or more (mechanical) fasteners 106 (e.g., one or more pushpins, bolts, screws, rivets, clips, etc.), each of which is configured as a discrete component of the storage system 100. While the storage system 100 is illustrated as including two brackets 104 and two fasteners 106 in the particular embodiment illustrated, it should be appreciated that the specific number of brackets 104 and fasteners 106 may be varied in alternate embodiments without departing from the scope of the present disclosure. For example, an embodiment of the storage system 100 including a single bracket 104 and a single fastener 106 is also envisioned herein (e.g., depending upon the configuration of the seat 14 and the receiving area 26, the material(s) used in construction of the storage compartment 102 and the bracket 104, etc.).

As described in further detail below, the storage compartment 102 and the brackets 104 are configured such that the brackets 104 are connectable to the storage compartment 102 in multiple orientations, which allows for use of the storage system 100 with seats 14 that vary in configuration. More specifically, in the particular embodiment illustrated, the storage compartment 102 and the brackets 104 are configured such that the brackets 104 are connectable to the storage compartment 102 in a first orientation (FIG. 6A), which corresponds to a first configuration of the seat 14 (e.g., in which the seat 14 is movable in eight degrees-of-freedom), and in a second orientation (FIG. 6B), which corresponds to a second configuration of the seat 14 (e.g., in which the seat 14 is movable in four degrees-of-freedom).

The storage compartment 102 is configured to receive (accommodate, store) at least one personal article A. Although generally illustrated as being configured to receive an umbrella U (FIGS. 6A, 6B), it should be appreciated that the storage compartment 102 may be configured to receive a variety of personal articles A, which may vary in number and/or configuration. For example, it is envisioned that the storage compartment 102 may be configured to receive articles of clothing (e.g., a pair of gloves), loose change, maps, cell phones or other such personal electronics, beverage containers, etc.

The storage compartment 102 may include any suitable material or combination of materials and may be formed through any suitable method of manufacture (e.g., injection molding, casting, laser machining, etc.). In the particular embodiment illustrated, the storage compartment 102 includes (e.g., is formed partially or entirely from) one or more non-metallic materials, such as plastic(s), polymer(s), and/or composite materials (e.g., carbon fiber). Embodiments in which the storage compartment 102 may include (e.g., may be formed partially or entirely from) one or more metallic materials, however, such as aluminum or stainless steel, are also envisioned herein and would not be beyond the scope of the present disclosure.

In certain embodiments, it is envisioned that the material(s) used in construction of the storage compartment 102 may include a wipeable finish to facilitate cleaning of the storage compartment 102. Additionally, or alternatively, it is envisioned that the storage compartment 102 may correspond in color to the seat 14, to the floor 22 of the vehicle 10, etc., in order improve the overall aesthetic appearance of the passenger seating area 12.

The storage compartment 102 includes a body 108 (FIG. 4) having opposite (lateral) ends 110, 112, and defines a width Ws, which extends in parallel (or generally parallel) relation to the width Wv (FIG. 1) of the vehicle 10 along a (first) axis X1, a depth Ds, which extends in parallel (or generally parallel) relation to the length Lv (FIG. 1) of the vehicle 10 along a (second) axis X2 that is oriented in generally orthogonal (perpendicular) relation to the axis X1, and a height Hs, which extends in parallel (or generally parallel) relation to the height Hv (FIG. 1) of the vehicle 10 along a (third) axis X3 that is oriented in (generally) orthogonal (perpendicular) relation to the axes X1, X2. In the particular embodiment illustrated, the ends 110, 112 of the body 108 are (generally) identical in configuration and the body 108 is configured such that the width Ws lies (substantially) with the range of (approximately) 6" to (approximately) 18", the depth Ds lies (substantially) with the range of (approximately) 2" to (approximately) 4", and the height Hs lies (substantially) with the range of (approximately) 2" to (approximately) 4". Embodiments in which the particular configuration of the body 108 may be varied are also envisioned herein, however, and would not be beyond the scope of the present disclosure. For example, depending upon the configurations of the seat 14, the drive mechanism(s) 20, and the receiving area 26, spatial constraints, the desired volume of the storage compartment 102, etc., embodiments are envisioned in which the ends 110, 112 of the body 108 may include non-identical configurations as are embodiments in which one or more of the dimensions Ws, Ds, and Hs may lie outside the disclosed ranges.

Figure 4:
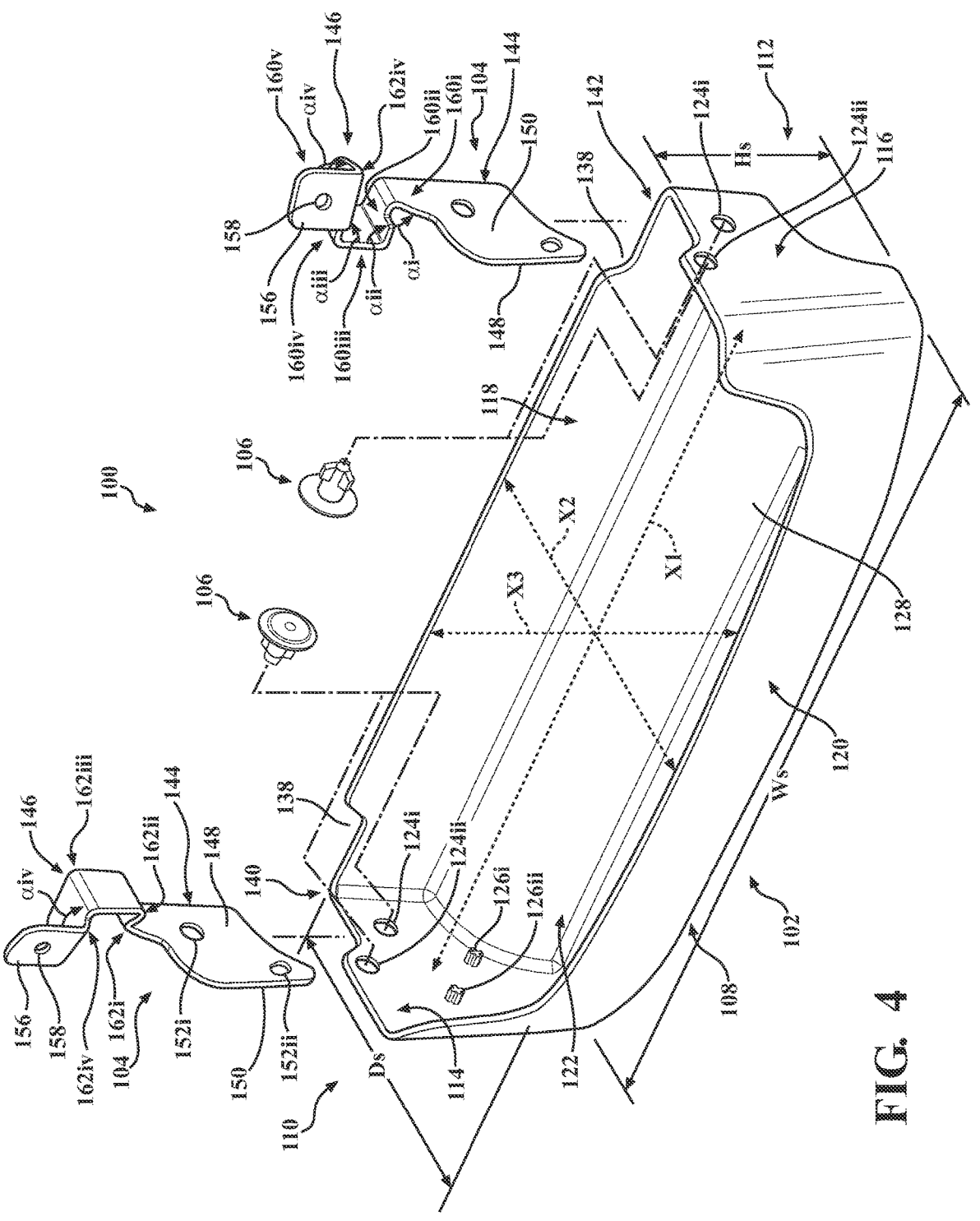
FIG. 4 is an exploded, perspective view of the storage system shown with parts separated.

With reference now to FIGS. 3-5 in particular, the body 108 includes: a pair of sidewalls 114, 116; a rear end wall 118; a forward (front) end wall 120; and a base wall 122. In the particular embodiment illustrated, the body 108 is integral (e.g., unitary, monolithic) in construction. As such, the sidewalls 114, 116, the rear end wall 118, the forward end wall 120, and the base wall 122 are formed from a single piece of material such as, for example, via injection molding. Embodiments are also envisioned, however, in which the sidewalls 114, 116, the rear end wall 118, the forward end wall 120, and/or the base wall 122 may be configured as discrete components that may be connected together in any suitable manner including, for example, via one or more mechanical fasteners (e.g., pushpins, bolts, screws, rivets, clips, etc.), via an interference (snap) fit, via dovetail interfaces, etc.

Figure 6A:
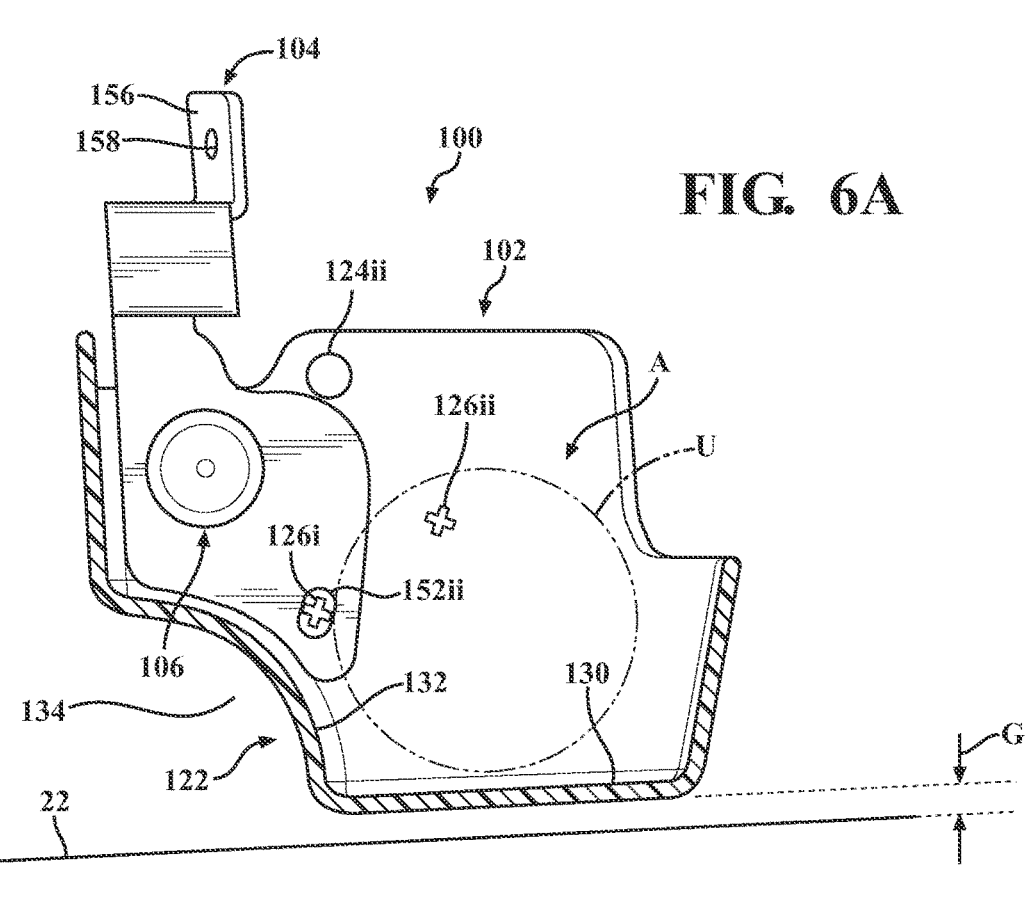
FIG. 6A is a side, plan view of the storage system shown in a first orientation.
Figure 6B:
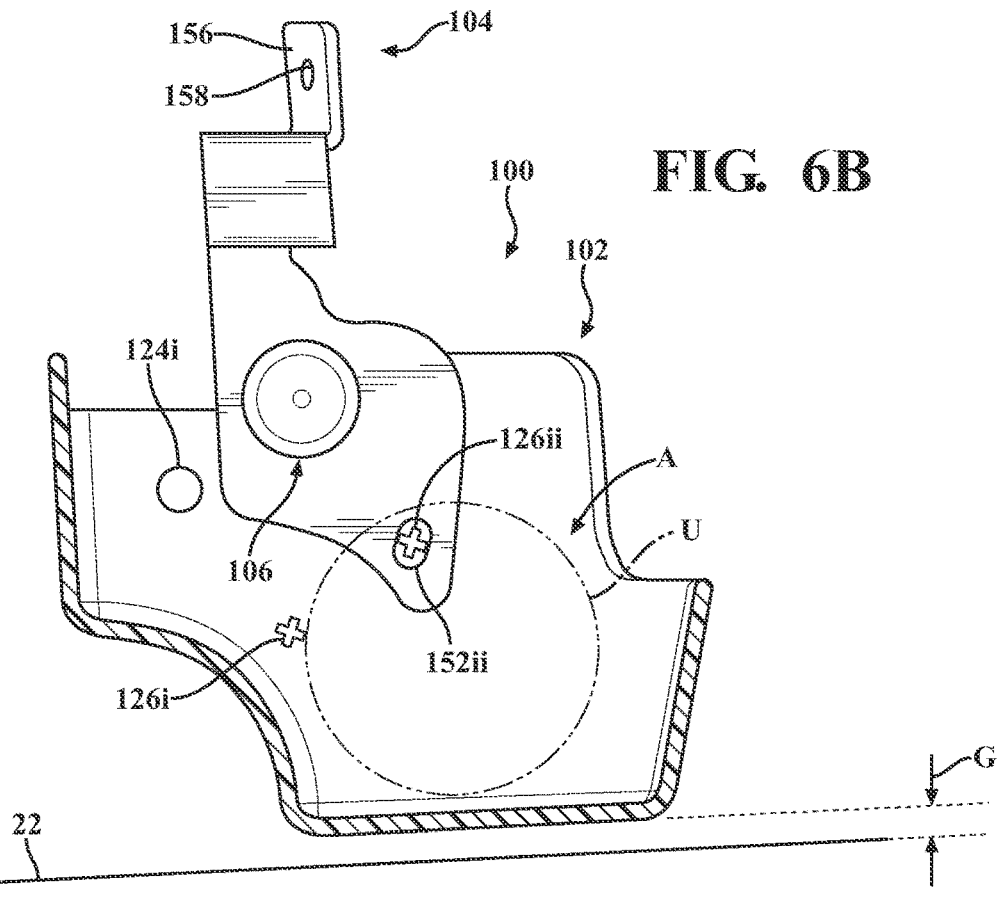
FIG. 6B is a side, plan view of the storage system shown in a second orientation.

The sidewalls 114, 116 are (generally) identical in configuration and each include at least one opening 124 that is configured to receive one of the aforementioned fasteners 106 and at least one locator pin 126 that extends (inwardly) therefrom and which is configured for engagement (contact)

with the brackets 104 to facilitate proper relative positioning (registration) of the brackets 104 and the storage compartment 102, as described in further detail below. In the particular embodiment illustrated, each of the sidewalls 114, 116 includes a (first) opening 124*i* and a (first) locator pin 126*i*, which are utilized to connect the brackets 104 to the storage compartment 102 in the first orientation (FIG. 6A), as well as a (second) opening 124*ii* and a (second) locator pin 126*ii*, which are utilized to connect the brackets 104 to the storage compartment 102 in the second orientation (FIG. 6B). More specifically, the first openings 124*i* are configured to receive the fasteners 106 such that the fasteners 106 extend through the brackets 104 and into the first openings 124*i* when the brackets 104 are in the first orientation, and the second openings 124*ii* are configured to receive the fasteners 106 such that the fasteners 106 extend through the brackets 104 and into the second openings 124*ii* when the brackets 104 are in the second orientation. Similarly, the first locator pins 126*i* are configured for insertion into the brackets 104 when the brackets 104 are in the first orientation, and the second locator pins 126*ii* are configured for insertion into the brackets 104 when the brackets 104 are in the second orientation.

Although shown as being offset along the depth Ds of the storage compartment 102 (e.g., such that the locators pins 126*i*, 126*ii* are positioned forwardly of the corresponding openings 124*i*, 124*ii*, respectively), embodiments are also envisioned in which the locators pins 126*i*, 126*ii* may be aligned with the respective openings 124*i*, 124*ii* along the along the depth Ds of the storage compartment 102 (e.g., depending upon the configuration of the seat 14, the configuration of the receiving area 26 (FIGS. 2, 3), the configuration of the storage compartment 102, the configuration of the brackets 104, etc.).

The rear end wall 118 and the forward end wall 120 extend between the pair of sidewalls 114, 116 in (generally) parallel relation to each other. As seen in FIG. 4, the forward end wall 120 defines a mouth 128 (e.g., an opening, ingress, window, etc.), which allows for insertion of the personal article(s) A (FIGS. 6A, 6B) into the storage compartment 102 and removal of the personal article(s) A therefrom.

The base wall 122 extends between the sidewalls 114, 116, the rear end wall 118, and the forward end wall 120, and includes a first segment 130 (FIG. 6A) that is (generally) linear in configuration and a second segment 132 that is non-linear (e.g., arcuate, curved) in configuration. More specifically, in the particular embodiment illustrated, the second segment 132 includes a concave configuration, which defines a well 134 (e.g., a recess, an indentation, etc.) that is configured to at least partially receive, and thereby create increased clearance for, the drive mechanism 20 (FIG. 2) of the corresponding seat 14.

In order to facilitate positioning of the storage system 100 in the under-seat location described herein, the storage compartment 102 (e.g., the body 108) defines a contour 136 (FIG. 3) (e.g., an outer profile) corresponding to that defined by the receiving area 26, which is dictated by the configuration of the seat 14, the configuration of the drive mechanism 20, etc. For example, in the particular embodiment illustrated, the ends 110, 112 of the body 108 include (generally) identical recesses 138 that are configured to accommodate (receive) and/or conceal one or more components of the seat 14, the drive mechanism 20, etc. More specifically, the recesses 138 span rear corner sections 140, 142 of the body 108 and extend into the sidewalls 114, 116 and the rear end wall 118. In various embodiments of the disclosure, however, depending upon the configurations of the seat 14, the drive mechanism(s) 20, etc., it is envisioned that the configurations of the recesses 138 may be varied or that the recesses 138 may be eliminated altogether.

With continued reference to FIGS. 3-5, the brackets 104 will be discussed. The brackets 104 are configured for connection (are connectable) to the storage compartment 102 and the seat 14 such that the brackets 104 extend therebetween. The brackets 104 may include any suitable material or combination of materials and may be formed through any suitable method of manufacture (e.g., injection molding, casting, laser machining, etc.). In the particular embodiment illustrated, the brackets 104 include (e.g., are formed partially or entirely from) one or more metallic materials, such as aluminum or stainless steel. As such, in the particular embodiment of the storage system 100 described herein, the storage compartment 102 and the brackets 104 includes different materials of construction (e.g., the storage compartment 102 includes a first material of construction and the brackets 104 include a second, different material of construction). Embodiments in which the brackets 104 may include (e.g., may be formed partially or entirely from) one or more non-metallic materials, such as plastic(s), polymer(s), and/or composite materials (e.g., carbon fiber), however, are also envisioned herein (e.g., embodiments in which the storage compartment 102 and the brackets 104 may include the same material(s) of construction) and would not be beyond the scope of the present disclosure.

Each bracket 104 includes a body portion 144 and one or more arms 146 that extend (vertically upward) therefrom. In the particular embodiment illustrated, the brackets 104 are integral (e.g., unitary, monolithic) in construction. As such, the body portion 144 and the arm(s) 146 are formed from a single piece of material such as, for example, via laser machining. Embodiments are also envisioned, however, in which the body portion 144 and the arm(s) 146 may be configured as discrete components that may be connected together in any suitable manner including, for example, via one or more mechanical fasteners (e.g., pushpins, bolts, screws, rivets, clips, etc.), via an interference (snap) fit, via dovetail interfaces, etc.

The body portion 144 includes a platelike configuration that defines respective inner and outer surfaces 148, 150 that extend in (generally) parallel relation as well as (first) aperture 152*i* and a (second) aperture 152*ii*. The apertures 152*i* are configured to receive the fasteners 106 such that the fasteners 106 extend through the apertures 152*i* and into the openings 124 in the sidewalls 114, 116 of the body 108 of the storage compartment 102, and the apertures 152*ii* are configured to receive the locator pins 126 such that the locator pins 126 extend into the brackets 104 in the first and second orientations (FIGS. 6A, 6B). More specifically, when the bracket 104 is in the first orientation (FIG. 6A), the fasteners 106 extend into (through) the apertures 152*i* and the openings 124*i* and the locator pins 126*i* extend into the apertures 152*ii*. Similarly, when the bracket 104 is in the second orientation (FIG. 6B), the fasteners 106 extend into (through) the apertures 152*i* and into the openings 124*ii*, and the locator pins 126*ii* extend into the apertures 152*ii*. Receipt of the locator pins 126 within the apertures 152 not only facilitates proper relative positioning (registration) of the brackets 104 and the storage compartment 102 (e.g., to facilitate alignment of the apertures 152*i* and the openings 124 and insertion of the fasteners 106), but inhibits (if not entirely prevents) relative movement between the storage compartment 102 and the brackets 104 (e.g., along the axis X2 (FIG. 4)).

In the particular embodiment illustrated, the apertures 152*i*, 152*ii* are (generally) identical in configuration. Embodiments are also envisioned, however, in which the apertures 152*i*, 152*ii* may include non-identical configurations. For example, it is envisioned that the apertures 152*i* may extend entirely through the body portion 144, as illustrated, and that the apertures 152*ii* may extend (partially) into the body portion 144 so as to define recesses (or other such depressions) that are configured to receive the locator pins 126.

The arms 146 extend from the body portion 144 and are configured to receive one or more (mechanical) fasteners 154 (FIG. 3) (e.g., one or more pushpins, bolts, screws, rivets, clips, etc.), which extend through a (forward-facing, front facing) mounting surface 156 of the bracket 104 that is configured for engagement (contact) with an inner surface 28 (FIG. 3) of the seat 14 (e.g., the seat pan 24) to thereby (mechanically) connect the brackets 104 to the seat 14. In order to facilitate such connection, each mounting surface 156 defines an aperture 158 that is configured to receive one of the fasteners 154.

In the particular embodiment illustrated, the fasteners 154 and the seat 14 are illustrated as discrete components. Embodiments are also envisioned, however, in which the fasteners 154 may be integrally (e.g., unitarily, monolithically) formed with the seat pan 24. For example, it is envisioned that the fasteners 154 may include a threaded shank that is configured for insertion into the apertures 158 and connection to the brackets 104 via a corresponding nut (or the like). Alternatively, it is envisioned that the fasteners 154 may be configured as detents (or other such protrusions) that extend (inwardly) from the inner surface 28 of the seat 14 and which are configured for insertion into the apertures 158 (e.g., in an interference (snap) fit).

The arms 146 include one or more segments 160 that are configured so as to impart a non-linear, tortuous configuration to the arms 146, which results in the aforementioned (forward-facing) orientation of the mounting surface 156. It is envisioned, however, that the particular configuration of the arms 146 may be altered in various embodiments in order to facilitate connection of the brackets 104 to the seat 14 in any suitable manner and/or location. For example, embodiments in which the arms 146 may include a twisted configuration are also envisioned herein and would not be beyond the scope of the present disclosure.

As seen in FIGS. 4 and 5, each arm 146 includes: a (first) segment 160*i*; a (second) segment 160*ii*; a (third) segment 160*iii*; a (fourth) segment 160*iv*; and a (fifth) segment 160*v*, which defines the mounting surface 156, each of which includes a (generally) linear configuration. The segment 160*i* extends from the body portion 144 along a (first) axis Y1 that is oriented in (generally) parallel relation to the height Hs of the storage compartment 102 (and the axis X3), the segment 160*ii* is connected to the segment 160*i* and extends along a (second) axis Y2 that is oriented in (generally) parallel relation to the width Ws of the storage compartment 102 (and the axis X1), the segment 160*iii* is connected to the segment 160*ii* and extends along a (third) axis Y3 that is oriented in (generally) parallel relation to the height Hs of the storage compartment 102 (and the axes Y1, X3), the segment 160*iv* is connected to the segment 160*iii* and extends along a (fourth) axis Y4 that is oriented in (generally) parallel relation to the width W of the storage compartment 102 (and the axes X1, Y2), and the segment 160*v* is connected to the segment 160*iv* and extends along a (fifth) axis Y5 that is oriented in (generally) parallel relation to the height Hs of the storage compartment 102 (and the axes Y1, Y3, X3). More specifically, the segments 160*i*, 160*ii* are connected by a (first) elbow 162*i* such that the elbow 162*i* is located between the segments 160*i*, 160*ii*, the segments 160*ii*, 160*iii* are connected by a (second) elbow 162*ii* such that the elbow 162*ii* is located between the segments 160*ii*, 160*iii*, the segments 160*iii*, 160*iv* are connected by a (third) elbow 162*iii* such that the elbow 162*iii* is located between the segments 160*iii*, 160*iv*, and the segments 160*iv*, 160*v* are connected by a (fourth) elbow 162*iv* such that the elbow 162*iv* is located between the segments 160*iv*, 160*v*, wherein the elbows 162*i*, 162*ii*, 162*iii*, 162*iv* define respective (first, second, third, and fourth) angles αi, αii, αiii, αiv.

In the particular embodiment illustrated, the bracket 104 is configured such that the angles αi, αii, αiii, αiv respectively defined by the elbows 162*i*, 162*ii*, 162*iii*, 162*iv* are each (substantially) equal to (approximately) 90°, which results in orientation of the mounting surfaces 156 in (generally) parallel relation to the width Ws and the height Hs of the storage compartment 102 and in (generally) orthogonal (perpendicular) relation to the depth Ds of the storage compartment 102. It should be appreciated, however, that the configurations of the elbows 162 may be altered in various embodiments without departing from the scope of the present disclosure. For example, depending upon the configuration of the seat 14, the configuration of the receiving area 26, etc., embodiments are envisioned in which the mounting surfaces 156 may be oriented in opposite directions (e.g., such that the mounting surfaces 156 are oriented in (generally) parallel relation to the depth Ds and the height Hs of the storage compartment 102 and in (generally) orthogonal (perpendicular) relation to the width Ws of the storage compartment 102).

With continued reference to FIGS. 4 and 5, the fasteners 106 extend through the brackets 104 (via the apertures 152*i*) and into the storage compartment 102 to thereby (mechanically) connect the brackets 104 and the storage compartment 102 such that the brackets 104 extend between the storage compartment 102 and the seat 14, as indicated above and seen in FIG. 3. The fasteners 106 are configured to establish a stationary (e.g., non-pivotable) connection between the storage compartment 102 and the brackets 104 so as to inhibit (if not entirely prevent) relative movement between the storage compartment 102 and the brackets 104 and may be configured in any manner suitable for that intended purpose.

In the particular embodiment illustrated, the fasteners 106 are configured to removably connect the storage compartment 102 and the brackets 104. Embodiments in which the fasteners 106 may be configured to non-removably connect the storage compartment 102 and the brackets 104, however, are also envisioned herein and would not be beyond the scope of the present disclosure.

With reference now to FIGS. 1-6B, a method of creating under-seat storage in the vehicle 10 using the storage system 100 will be discussed, which includes connecting the storage compartment 102 to the seat 14 via the brackets 104 such that the storage compartment 102 is located beneath the seat 14 (e.g., within the receiving area 26 (FIGS. 2, 3)) with the brackets 104 extending therebetween. More specifically, the method includes connecting the brackets 104 to the seat 14 (e.g., the seat pan 24) by positioning the mounting surfaces 156 (FIGS. 4, 5) adjacent to the inner surface 28 (FIG. 3) of the seat 14 and inserting of the fasteners 154 into the apertures 158, and connecting the storage compartment 102 to the brackets 104 by inserting the fasteners 106 through the brackets 104 and into the body 108. Upon connection of the brackets 104 to the seat 14 and connection of the storage compartment 102 to the brackets 104, the storage compartment 102 is positioned such that the drive mechanism 20 (FIG. 2) is (partially or entirely) received by the well 134 (FIG. 6A) defined by the base wall 122 of the storage compartment 102, thereby concealing, protecting, and obscuring the drive mechanism 20 from view.

Depending upon the configuration of the seat 14, the brackets 104 may be connected to the storage compartment 102 in either the first orientation (FIG. 6A) or the second orientation (FIG. 6B). In the first orientation, the storage compartment 102 and the brackets 104 are connected by inserting the locator pins 126*i* on the storage compartment 102 into the apertures 152*ii* defined by the brackets 104 and by inserting the fasteners 106 through the apertures 152*i* defined by the brackets 104 and into the openings 124*i* defined by the storage compartment 102. By contrast, in the second orientation, the storage compartment 102 and the brackets 104 are connected by inserting the locator pins 126*ii* on the storage compartment 102 into the apertures 152*ii* defined by the brackets 104 and by inserting the fasteners 106 through the apertures 152*i* defined by the brackets and into the openings 124*ii* defined by the storage compartment 102. As indicated above, insertion of the locator pins 126 into the apertures 152*ii* facilitates proper relative positioning (registration) of the brackets 104 and the storage compartment 102 and alignment of the apertures 152*i* and the openings 124, thereby simplifying connection of the storage compartment 102 and the brackets 104.

In various embodiments of the disclosed method, it is envisioned that the storage compartment 102 may be connected to the brackets 104 either prior or subsequent to connection of the brackets 104 to the seat 14 depending, for example, upon the configuration of the seat 14, the configuration of the receiving area 26, spatial constraints, etc.

Following installation of the storage system 100, the storage compartment 102 may be utilized to store the personal article(s) A (FIGS. 6A, 6B), which may be inserted into the body 108 of the storage compartment 102 via passage through the mouth 128 in the forward end wall 120.

Persons skilled in the art will understand that the various embodiments of the disclosure described herein and shown in the accompanying figures constitute non-limiting examples, and that additional components and features may be added to any of the embodiments discussed herein above without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/ or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°±25% (e.g., an angle that lies within the range of (approximately) 135° to (approximately) 225°) and the term "generally orthogonal" should be understood as referring to configurations in with the pertinent components are oriented so as to define an angle therebetween that is equal to 90°±25% (e.g., an angle that lies within the range of (approximately) 67.5° to (approximately) 112.5°). The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicle comprising:
   a passenger seating area;
   a seat repositionable within the passenger seating area;
   a drive mechanism operatively connected to the seat such that the seat is movable within the passenger seating area; and
   a storage system configured to receive at least one personal article, the storage system including:
      a bracket connected to the seat such that the storage system is fixed in relation to and is positioned beneath the seat, wherein the at least one personal article can be inserted and removed from the storage system when the seat is in a seated position; and a storage compartment connected to the bracket such that the bracket extends between the seat and the storage compartment, wherein the bracket is configured for connection to the storage compartment in multiple orientations.

2. The vehicle of claim 1, wherein the storage compartment includes:

a pair of sidewalls; a rear end wall extending between the pair of sidewalls;

a forward end wall extending between the pair of sidewalls; and a base wall extending between the pair of sidewalls, the rear end wall, and the forward end wall, the base wall defining a well configured to at least partially receive the drive mechanism and thereby create increased clearance for the drive mechanism.

3. The vehicle of claim 1, wherein the bracket and the storage compartment are configured as discrete components of the storage system, the storage system further including a fastener extending through the bracket and into the storage compartment to thereby connect the bracket and the storage compartment.

4. The vehicle of claim 3, wherein the storage compartment includes:

at least one opening configured to receive the fastener; and at least one locator pin configured for engagement with the bracket to facilitate proper relative positioning of the bracket and the storage compartment.

5. The vehicle of claim 4, wherein the bracket includes:

a first aperture configured to receive the fastener; and a second aperture configured to receive the at least one locator pin.

6. The vehicle of claim 5, wherein the storage compartment is configured such that the bracket is connectable thereto in a first orientation corresponding to a first configuration of the seat and in a second orientation corresponding to a second configuration of the seat.

7. The vehicle of claim 6, wherein the storage compartment includes:

a first opening configured to receive the fastener such that the fastener extends through the first aperture in the bracket and into the first opening when the bracket is in the first orientation;

a first locator pin configured for insertion into the second aperture in the bracket when the bracket is in the first orientation;

a second opening configured to receive the fastener such that the fastener extends through the first aperture in the bracket and into the second opening when the bracket is in the second orientation; and a second locator pin configured for insertion into the second aperture in the bracket when the bracket is in the second orientation.

8. The vehicle of claim 1, wherein the bracket includes a forward-facing mounting surface configured for engagement with an inner surface of the seat.

9. The vehicle of claim 8, wherein the bracket includes an arm having:

a first segment extending along a first axis oriented in generally parallel relation to a height of the storage compartment;

a second segment connected to the first segment and extending along a second axis oriented in generally parallel relation to a width of the storage compartment;

a third segment connected to the second segment and extending along a third axis oriented in generally parallel relation to the first axis;

a fourth segment connected to the third segment and extending along a fourth axis oriented in generally parallel relation to the second axis; and a fifth segment connected to the fourth segment and extending along a fifth axis extending in generally parallel relation to the first axis and the third axis, the fifth segment defining the forward-facing mounting surface.

10. The vehicle of claim 9, wherein the bracket includes:

a first elbow located between the first segment and the second segment, the first elbow defining a first angle substantially equal to approximately 90°;

a second elbow located between the second segment and the third segment, the second elbow defining a second angle substantially equal to approximately 90°;

a third elbow located between the third segment and the fourth segment, the third elbow defining a third angle substantially equal to approximately 90°; and a fourth elbow located between the fourth segment and the fifth segment, the fourth elbow defining a fourth angle substantially equal to approximately 90°.

11. A storage system configured for connection to a repositionable seat in a vehicle, the storage system comprising:

a bracket configured for connection to the seat such that the storage system is fixed in relation to and is positioned beneath the seat;

a storage compartment configured to accommodate at least one personal article, wherein the bracket is configured for connection to the storage compartment in multiple orientations; and a fastener configured to connect the bracket to the storage compartment such that the bracket extends between the seat and the storage compartment.

12. The vehicle of claim 11, wherein the storage compartment defines a width extending along a first axis, a depth extending along a second axis oriented in generally orthogonal relation to the first axis, and a height extending along a third axis oriented in generally orthogonal relation to the first axis and the second axis, the bracket including a mounting surface configured for engagement with the seat and oriented in generally parallel relation to the width of the storage compartment and the height of the storage compartment and in generally orthogonal relation to the depth of the storage compartment.

13. The storage system of claim 11, wherein the bracket is connectable to sidewalls of the storage compartment.

14. The storage system of claim 13, wherein the storage compartment includes:

a first opening configured to receive the fastener when the bracket is in a first orientation;

a first locator pin;

a second opening configured to receive the fastener when the bracket is in a second orientation; and a second locator pin.

15. The storage system of claim 14, wherein the bracket includes:

a first aperture configured to receive the fastener; and a second aperture configured to receive the first locator pin when the bracket is in the first orientation and the second locator pin when the bracket is in the second orientation.

16. A method of creating under-seat storage in a vehicle, the method comprising:

connecting a bracket to a seat in the vehicle; and connecting a storage compartment to the bracket such that the storage compartment is located beneath the seat with the bracket extending therebetween and such that the storage compartment is fixed in relation to the seat, wherein the bracket is configured for connection to the storage compartment in multiple orientations, and at least one personal article can be inserted into and removed from the storage compartment when the seat is in a seated position.

17. The method of claim 16, wherein connecting the storage compartment to the seat includes positioning the storage compartment such that a drive mechanism operatively connected to the seat is at least partially received by a well defined by a base wall of the storage compartment.

18. The method of claim 16, wherein connecting the storage compartment to the seat includes positioning a forward-facing mounting surface defined by the bracket adjacent to an inner surface of the seat.

19. The method of claim 16, wherein connecting the storage compartment to the seat includes inserting a fastener through the bracket and into one of a first opening and a second opening defined by the storage compartment such that the fastener connects the bracket to the storage compartment.

20. The method of claim 19, wherein connecting the storage compartment to the seat further includes inserting one of a first locator pin and a second locator pin on the storage compartment into an aperture defined by the bracket to facilitate proper relative positioning of the bracket and the storage compartment.

\* \* \* \* \*